July 2, 1963
J. R. RANSOM
3,096,483
FREQUENCY DIVIDER SYSTEM WITH PRESET MEANS
TO SELECT COUNTDOWN CYCLE
Filed April 6, 1961
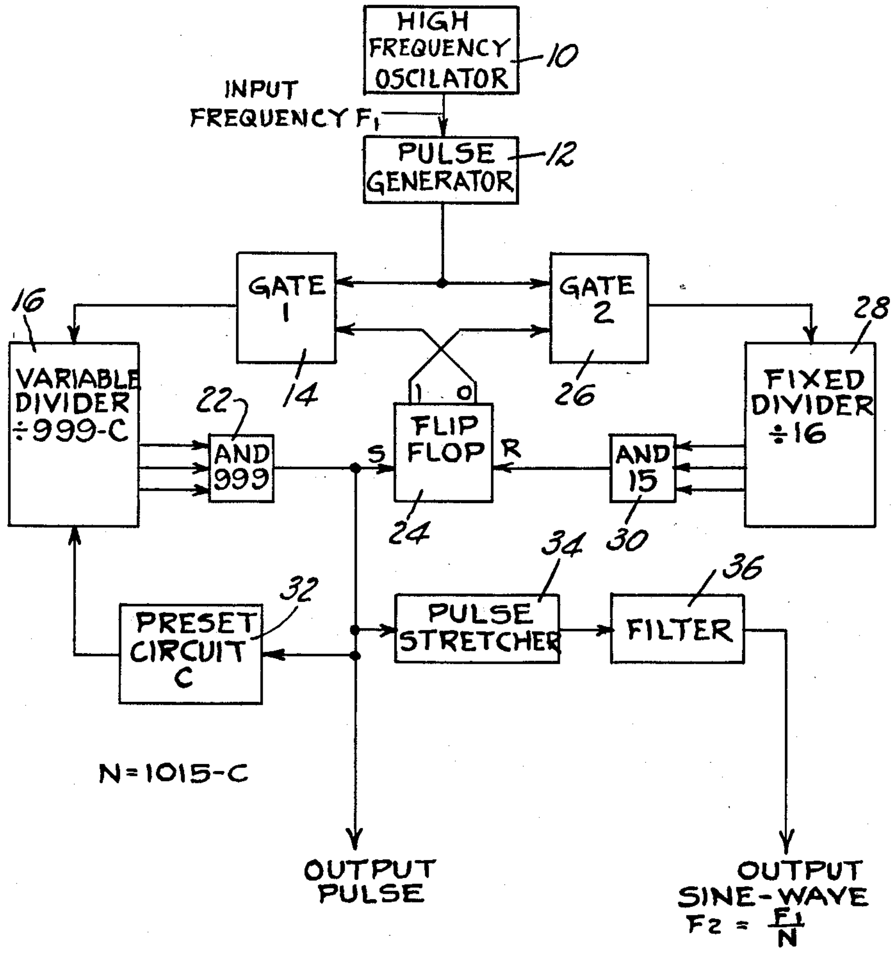
INVENTOR.
JAMES R. RANSOM
BY
Robert C. Smith
ATTORNEY United States Patent Office 3,096,483

Patented July 2, 1963

3,096,483

FREQUENCY DIVIDER SYSTEM WITH PRESET MEANS TO SELECT COUNTDOWN CYCLE

James R. Ransom, Baltimore, Md., assignor to The Bendix Corporation, Towson, Md., a corporation of Delaware Filed Apr. 6, 1961, Ser. No. 101,187

7 Claims. (Cl. 328—48)

This invention relates to electrical frequency dividers and more particularly to a digital frequency divider circuit incorporating a system for overcoming the disadvantages introduced by the slow reset time usually encountered in the counter circuits and the delay in propagating a pulse down a long counter chain.

In the design of frequency synthesizers, there is need for a high speed frequency divider which will divide a comparatively high frequency signal such as 1.0 mc., for example, by a larger integer N of the order of 100 or 1000. Prior experience would seem to indicate that digital techniques would be useful to accomplish this division because they are easily reproducible in production and remain stable for long periods of time, but it has been found that some rather serious limitations have been introduced by the slow reset time of such digital dividers and by the time required to propagate a pulse down a long counter chain. Techniques for avoiding these limitations which have been proposed in the past have involved presetting at least the first stage of the variable divider in the interval between two successive pulses, which requires very fast preset circuitry, or else have used complex selection of the reset value on the decades to compensate for presetting delays. In some systems the upper frequency limit of the system is controlled by the preset time of the variable divider. It is, therefore an object of the present invention to provide a reset system for use with a digital frequency divider which will overcome the above mentioned limitations and will permit the use of a digital counter as a frequency divider up to frequencies of 10 mc. or higher.

It is another object of the present invention to provide a reset scheme for use with a digital frequency divider which does not require the provision of very fast preset circuitry for presetting stages of the digital unit.

It is another object of the present invention to provide a reset system for use with a digital frequency divider which does not require complex selection of reset values in the decades to avoid presetting delays.

It is a further object of the present invention to provide a reset system for a digital frequency divider which will permit division by any desired ratio rather than by a limited number of values such as might be the product of small integers.

Other objects and advantages wil become apparent from the following specification and drawing in which:

The single FIGURE is a block diagram showing my reset scheme in combination with a digital frequency divider.

Referring to the drawing, an input voltage of a comparatively high frequency such as 10 mc. is supplied from a source 10, such as a crystal-controlled oscillator, to a pulse generator 12 which produces an output pulse for every cycle of the input voltage. These pulses are supplied to a gate circuit 14 which, assuming it is in its reset state, transmits these pulses to a variable divider 16 which may be a conventional three decade counter preset to a number C between 1 and 1000 by means to be discussed below. (The counting devices and the specific numbers described are used by way of example only.) After (999–C) pulses, the divider reaches a full count of 999 which is sensed by an "AND" circuit 22. This circuit thus produces a pulse which is supplied to a standard bistable or flip-flop circuit 24. The flip-flop circuit 24 then emits signals which close gate 14 and open a gate

26. The pulses from the pulse generator 12 are then blocked by gate 14 and directed through the open gate 26 to a fixed divider circuit 28 which may consist of a series of four binary counters and which is capable of storing a total of 16 counts or pulses. The fifteenth or full count is sensed by an "AND" circuit 30 which transmits a pulse to reset the flip-flop circuit 24, which then emits signals which close gate 26 and open gate 14. The pulses from generator 12 are then again fed through gate 14 to the variable divider 16. The use of the "AND" circuit described and the numbers of pulses stored by the fixed divider 28 may be dependent upon the requirements of a given system. If a total of no more than ten counts of the pulse generator 12 were sufficient to permit resetting of the variable divider 16, the fixed divider could be a single ten-element vacuum tube such as the type BX1000 Beam-X tube manufactured by the Burroughs Corporation. In such case the "AND" circuit 30 would not be required and the bistable circuit 24 would simply be connected to respond to a signal on a given anode of the tube. Alternatively, a series of binaries might be arranged with a reset feedback arrangement which limits the possible count to some integer less than the maximum possible for the series. A signal on the feedback line would be an obvious source for an input to trigger the bistable circuit 24.

The output of the "AND" circuit 22, which may be the output of the system, is a pulse which is sensed by a variable preset circuit 32. It is the function of this preset circuit to reset the variable divider 16 to the desired number C such that when the variable divider reaches a full count (in the present example 999) it will actually have counted (999–C) pulses from the generator 12 before creating an output pulse. The specific configuration and operation of the preset circuit 32 will vary somewhat depending upon the nature of the counting devices used in the variable divider 16. A very common arrangement is to use a series of binary units having the appropriate internal feedback such that they count to ten and then advance the next decade unit one step. Three such decade units will provide the desired count to 999. The preset circuit 32 must provide to each of the individual decade units, pulses which can set the individual multivibrators into the proper binary states to represent the desired integers. Any of several well known binary counting schemes may be used and the switching means used in the preset circuit 32 must be made capable of directing the reset pulses to the proper binary in accordance with the counting scheme selected. The manner of resetting such decade counters is well known in the art. A typical example is shown and described in an article entitled "A High Speed Digital Frequency Divider of Arbitrary Scale" by Robert W. Stuart appearing in the 1954 Convention Record of the Institute of Radio Engineers, part 10, pp. 52–57. A typical binary decade unit is also discussed in this article.

The arrangement thus far described will produce an output which is a series of pulses of the desired frequency. If a sine wave output is required this pulse output is supplied to a pulse stretcher 34 which may be a monostable or "single-shot" multivibrator and a filter circuit 36. The output frequency of the filter circuit is then equal to the frequency of the input to the pulse generator divided by N where N is the division factor of the entire frequency divider described above.

Operation of the system described above may be best described by considering a typical frequency division. In an overall frequency synthesizer, various means other than oscillator 10 may be employed to provide a desired frequency $F_1$ at the input to the pulse generator 12. Such means are outside the scope of the present disclosure. Assume that a frequency of 1.54445 mc. is supplied as an input to pulse generator 12. The pulse generator emits a series of pulses at the same frequency and supplies these pulses through gate 14 to the variable divider 16 where these pulses are counted. If an output of 1.955 kc. is desired, an overall division by 790 must be accomplished. The variable divider 16 is set by the preset circuit 32 to count a total of C counts during one cycle. So that the count of the fixed divider 28 may be considered, C equals 1015–N or 225 counts. The variable divider thus is preset to 225 counts and the input from the gate 14 causes the first pulse to be counted as number 226 and the succeeding pulses are counted through the decades until at the 999th pulse, the "AND" circuit 22 senses this value and provides an output pulse which goes to the output terminal, the present circuit 32 and to the bistable device 24 which quickly closes gate 14 and opens gate 26 so that the 1000th pulse and the subsequent 15 pulses are supplied to the fixed divider 28. During the time these 16 counts are being stored in divider 28, the preset circuit 32 is again setting the decades in the variable divider 16 to the number 225. When the full sixteen counts have been supplied to the fixed divider 28, the "AND" circuit 30 recognizes the full count and supplies the last pulse to the bistable device 24 to cause it to close gate 26 and open gate 14. The variable divider 16 having been preset to 225 counts in the previous interval of sixteen counts then passes the next 774 counts before it reaches a full count of 999 and emits a new output pulse. The total period between output pulses is thus 774 counts of the variable divider 16 plus 16 counts of the fixed divider 28 to equal 790 counts.

Modifications will be obvious to those skilled in the art. While the invention has been primarily described above in connection with techniques involving binary units preferably described using solid state devices, other systems of decade counting may be employed such as the ten element vacuum tubes referred to above. Where such tubes are used, one or both of the "AND" circuits 22 and 30 may be eliminated. Also, it may occur in some installations that the output pulse is too short in duration to satisfactorily operate the preset circuit. In such case the pulse stretcher 34 could be connected ahead of the preset circuit 32. There is, of course, a lower limit of the division ratio equal to the count of the fixed divider.

What is claimed is:

1. A system for providing a frequency division of a high frequency alternating current signal comprising a pulse generator for converting said alternating current signal into a series of pulses of the same frequency as said signal, first and second gate circuits connected to said pulse generator, a bistable circuit connected to control said gate circuits, a variable divider circuit including a plurality of decade counter units connected to said first gate, a preset device for resetting said variable divider to a desired number, an "AND" circuit responsive to a full count of said variable divider circuit for transmitting a pulse to an external utilization device, to said preset circuit and to said bistable circuit to cause said bistable circuit to close said first gate circuit and to open said second gate circuit, a fixed divider circuit connected to said second gate circuit including binary counting means for storing a plurality of pulses during the time required for said preset circuit to reset said variable divider, and a second "AND" circuit responsive to a full count of said fixed divider circuit for transmitting a pulse to said bistable circuit to close said second gate and open said first gate to permit pulses from said pulse generator to be supplied to said variable divider, whereby the frequency of output of said pulse generator is divided by a positive integer controlled by a setting of said preset circuit.

2. A system for providing a frequency division of a high frequency alternating current signal comprising a pulse generator for converting said alternating current signal into a series of pulses of the same frequency as said signal, first and second gate circuits connected to said pulse generator, a flip-flop circuit connected to control said gate circuits, a variable divider circuit including a plurality of decade counter units connected to said first gate, a preset device for resetting said variable divider to a desired count, means responsive to a full count of said variable divider circuit for transmitting a pulse to said preset circuit and to said flip-flop circuit to cause said flip-flop circuit to close said first gate circuit and to open said second gate circuit, a second divider circuit connected to said second gate circuit including counting means for storing a plurality of pulses during the time required for said preset circuit to reset said variable divider, means responsive to a full count of said second divider circuit for causing said flip-flop circuit to close said second gate and open said first gate to permit pulses from said pulse generator to be supplied to said variable divider, whereby the output frequency of said pulse generator is divided by a positive integer equal to the number of counts in the full count of said variable divider as established by the presetting thereof plus the number of counts stored by said second divider.

3. A circuit for dividing a frequency of a high frequency alternating current signal by a positive integer comprising a pulse generator for converting said alternating current signal into a series of pulses of the same frequency as said signal, first and second gate circuits connected to said pulse generator, a bistable circuit connected to alternately open and close said gate circuits, a variable divider circuit including a plurality of decade counter units connected to said first gate, means for presetting said variable divider to a desired count value, means responsive to a full count of said variable divider circuit for transmitting a pulse to said presetting means and to said bistable device to cause said bistable device to close said first gate circuit and open said second gate circuit, a second divider circuit connected to receive pulses passing through said second gate including counting means for storing a plurality of pulses during the time required for said preset means to reset said variable divider to the desired initial count value, means responsive to a full count of said second divider circuit for causing said bistable circuit to close said second gate and open said first gate to permit pulses from said pulse generator to again be supplied to said variable divider, whereby the output frequency of said pulse generator is divided by a positive integer equal to the number of counts in the full count of said variable divider as established by the presetting thereof plus the number of counts stored by said second divider.

4. A circuit for dividing the frequency of a high frequency alternating current signal by a positive integer comprising a pulse generator for converting said alternating current signal into a series of pulses of the same frequency as said signal, first and second gate circuits connected to said pulse generator, a bi-stable circuit connected to control said gate circuits, a variable divider circuit including a plurality of counter units connected to said first gate, means for presetting said variable divider to a desired count value, means responsive to a full count of said variable divider circuit for transmitting a pulse to said presetting means and to said bistable device to cause said bistable device to close said first gate circuit and open said second gate circuit, a second divider circuit connected to receive pulses passing through said second gate including counting means for storing a plurality of pulses during the time required for said preset means to reset said variable divider to the desired initial count value, means responsive to a desired count of said second divider circuit for causing said bistable circuit to close said second gate and open said first gate to permit pulses from said pulse generator to again be supplied to said variable divider, whereby the output frequency of said pulse generator is divided by a positive integer controlled by the presetting of said variable divider, and the output frequency of said variable divider establishes the output frequency of the system.

5. A frequency dividing system comprising means for generating a high frequency alternating current signal, a pulse generator for converting said alternating current signal into a signal consisting of a series of pulses of the same frequency as said signal, a first path for the signals from said generator including a first resettable counter, an alternately effective second path for the signals from said generator including a second counter, means in each of said first and second counters which attains a unique state once in each cycle of counts equal to the sum of the counter settings, means responsive to the occurrence of said unique state in each of said counters to render effective the signal path to the other of said counters, and preset means responsive to the occurrence of said unique state in said first counter for presetting said first counter to a selectable value such that the total number of counts in one cycle of said first counter plus one cycle of said second counter equal said selected integer, whereby the output frequency of the first counter equals the frequency of said reference source divided by said selected integer.

6. A system for providing an electrical signal having a frequency determined by the frequency of a reference source divided by a selected integer comprising a first path for the signals from said reference source including a first resettable counter, an alternately effective second path for the signals from said reference source including a second counter, means in each of said first counter and said second counter which attains a unique state once in each cycle of counts equal to the sum of the counter settings, means responsive to the occurrence of said unique state in each of said counters to render effective the signal path to the other of said counters, and preset means responsive to the occurrence of said unique state in said first counter for presetting said first counter to a selectable value such that the total number of counts in one cycle of said first counter plus one cycle of said second counter equals said selected integer, whereby the output frequency of the first counter equals the frequency of said reference source divided by said selected integer.

7. A system for providing an electrical signal having a frequency determined by the frequency of a reference source divided by a selected integer, comprising a first path for the signals from said reference source comprising a first resettable counter, an alternately effective second path for the signals from said reference source including a second resettable counter, means responsive to the initiation of the resetting function in each of said counters to render effective the signal path to the other of said counters, and preset means responsive to the initiation of the resetting function in said first counter for presetting said first counter to a selectable value such that the total number of counts in one cycle of said first counter plus one cycle of said second counter equals said selected integer, whereby the output frequency of said first counter equals the frequency of said reference source divided by said selected integer.

References Cited in the file of this patent

UNITED STATES PATENTS 2,793,806 Lindesmith ------------ May 28, 1957

FOREIGN PATENTS 835,243 Great Britain ---------- May 18, 1960